United States Patent Office.

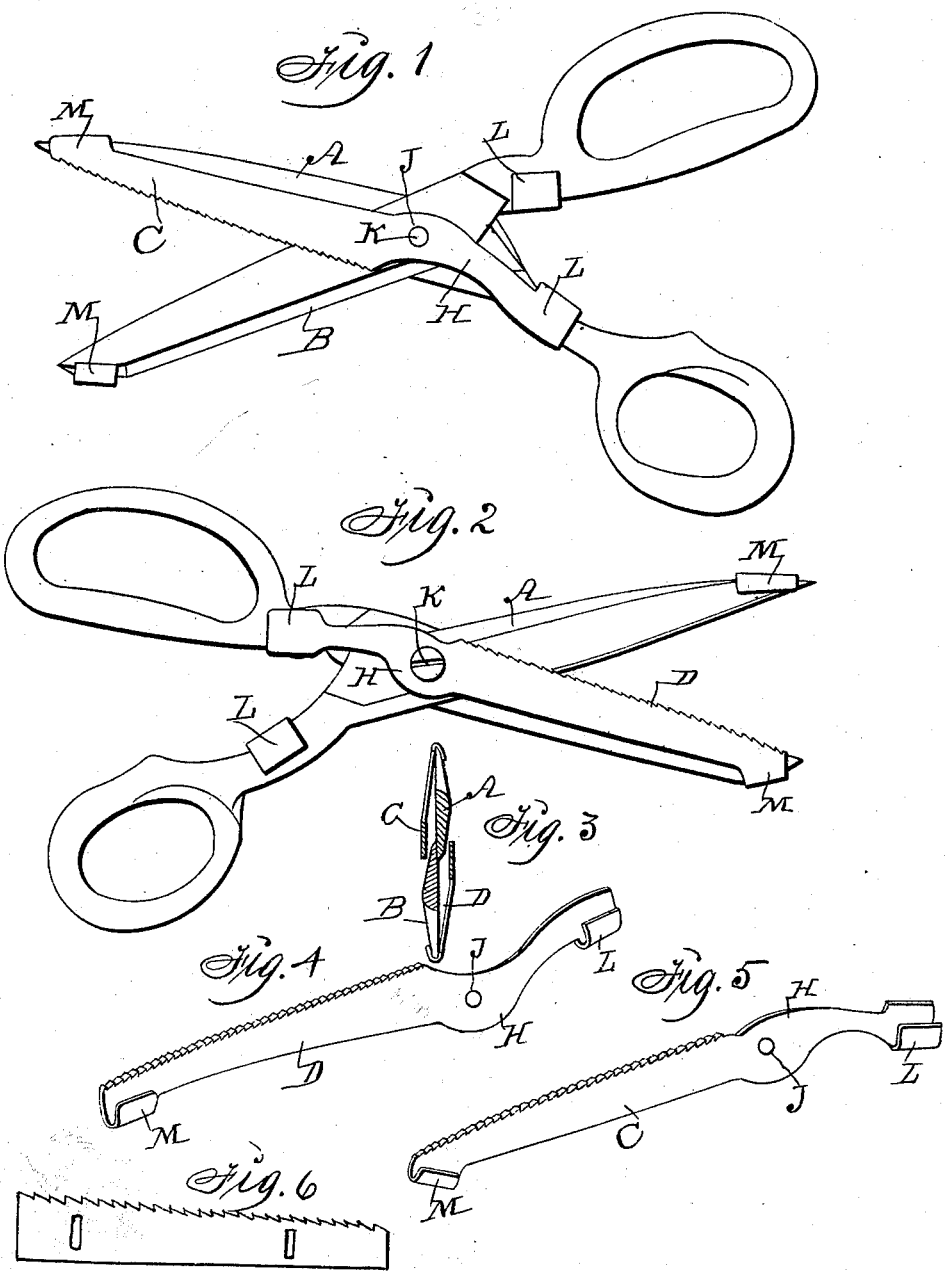

DAVID S. FLOWERS, OF GARNER, IOWA.

CLOTH-HOLDING ATTACHMENT FOR SHEARS.

SPECIFICATION forming part of Letters Patent No. 683,457, dated October 1, 1901.

Application filed June 4, 1901. Serial No. 63,137. (No model.)

*To all whom it may concern:*

Be it known that I, DAVID S. FLOWERS, a citizen of the United States, residing at Garner, in the county of Hancock and State of Iowa, have invented certain new and useful Improvements in Cloth-Holding Attachments for Shears, of which the following is a specification.

My object is to provide detachable jaws for shears especially adapted to facilitate cutting cloth and to prevent the annoyances incident to textile fabrics slipping and crowding and puckering when subjected to pressure between the cutting edges of the blades of scissors and shears as required in cutting and shaping goods for making garments and various other purposes. Heretofore a toothed plate has been fixed to one of the blades of a barber's shears to overlie the blade, but no provision was made for detachably fastening the ends of the plate to the shears.

My invention consists in the construction and application of toothed jaws to the blades, as hereinafter set forth, pointed out in my claim, and illustrated in the accompanying drawings, in which—

Figure 1 is a perspective view of a shears, showing my invention applied as required for practical use. Fig. 2 is a perspective view showing the reverse side from that shown in Fig. 1. Fig. 3 is a transverse sectional view of the two blades and the toothed jaws. Figs. 4 and 5 are perspective views of the jaws detached from the shears. Fig. 6 shows a modified form of jaw adapted to be detachably and adjustably fastened to a blade.

The letters A and B designate the mating blades of shears.

C and D are mating straight-edged jaws having integral curved extensions H, provided with perforations J, adapting them to be detachably fastened to the blades of the shears by means of the screw K. They are also provided with integral hook-shaped clasps L at their rear ends adapted to engage the handles of the blades and with hook-shaped clasps M at their front ends to engage the front end portions of the blades, as shown and as required to retain the jaws rigidly connected with the blades and to prevent the cloth or loose threads from getting between the front ends of the jaws and the shear-blades, to which they are adapted to be advantageously attached as required for practical use by means of the clasps on their ends and the pivotal screw that connects the blades.

In practical operation as the blades are closed upon any material or fabric that is to be cut the teeth of the jaws will engage such matter and prevent it from slipping or moving relative to the cutting edges of the blades, and thereby facilitate the operation of the shears advantageously for all the purposes for which scissors and shears are to be used.

Having thus described the purpose, construction, application, and operation of my invention, its practical utility will be readily understood by persons familiar with the art to which it pertains.

What I claim as new, and desire to secure by Letters Patent, is—

A cloth-holding attachment adapted to be detachably fastened to the blades of the shears comprising two toothed jaws having extensions at their rear ends provided with perforations and hook-shaped clasps at the rear ends of the extensions and hook-shaped clasps at the front ends of the jaws, in combination with shears, to operate in the manner set forth for the purposes stated.

DAVID S. FLOWERS.

Witnesses:
W. H. RAMSAY,
F. E. BLACKSTONE.